(12) United States Patent
Pillai

(10) Patent No.: US 7,038,616 B2
(45) Date of Patent: May 2, 2006

(54) TARGET IDENTIFICATION FROM A POOL OF TARGETS USING A NEW ADAPTIVE TRANSMITTER-RECEIVER DESIGN

(76) Inventor: S. Unnikrishna Pillai, 432 Harriot Ave., Harrington Park, NJ (US) 07640

( * ) Notice: Subject to any disclaimer, the term of this patent is extended or adjusted under 35 U.S.C. 154(b) by 191 days.

(21) Appl. No.: 10/743,368

(22) Filed: Dec. 22, 2003

(65) Prior Publication Data

US 2005/0134500 A1 Jun. 23, 2005

(51) Int. Cl.
*G01S 13/00* (2006.01)
(52) U.S. Cl. ......................................... 342/90; 342/165
(58) Field of Classification Search ............... 342/165, 342/90
See application file for complete search history.

(56) References Cited

U.S. PATENT DOCUMENTS

| | | | | |
|---|---|---|---|---|
| 3,278,935 A | * | 10/1966 | Pearson | 342/169 |
| 4,649,394 A | * | 3/1987 | Minker et al. | 342/94 |
| 4,992,797 A | * | 2/1991 | Gjessing et al. | 342/192 |
| 5,175,552 A | * | 12/1992 | Grieve et al. | 342/82 |
| 5,381,154 A | * | 1/1995 | Guerci | 342/90 |
| 5,431,568 A | * | 7/1995 | Fey et al. | 434/2 |
| 5,434,571 A | * | 7/1995 | Erle | 342/36 |
| 5,457,463 A | * | 10/1995 | Vencel et al. | 342/169 |
| 5,497,158 A | * | 3/1996 | Schmid et al. | 342/90 |
| 2001/0044680 A1 | * | 11/2001 | Lemelson et al. | 701/3 |

OTHER PUBLICATIONS

1. "Optimum Transmit—Receiver Design in the presence of Signal—Dependent Interference and Channel Noise" Copyright © 2003 IEEE. Reprinted from IEEE Transaction on information theory, vol. 46, No. 2, Mar. 2000.
2. "Join Optimal TX—RX Design for Multiple Target Identification Problem" Copyright © 2003 IEEE. Reprinted from Second IEEE Sensor Array and Multichannel Signal processing Workshop, 2002 (SAM 2002)), Aug. 4-6, 2002, Rosslyn, VA.

* cited by examiner

*Primary Examiner*—Thomas H. Tarcza
*Assistant Examiner*—Matthew Barker
(74) *Attorney, Agent, or Firm*—Walter J. Tencza, Jr.

(57) ABSTRACT

A design methodology for jointly optimizing the transmit waveform and receiver filter for multiple target identification is presented in presence of transmit signal dependent clutter like interference and noise. The methodology is applied and illustrated for various multiple 'target ID' problems in presence of transmit signal dependent clutter like interference and noise. The resulting correct target classification is significantly better than that achieved by a conventional chirp or any other transmit waveform. Unlike the classical radar case, the choice of transmit pulse shape can be critically important for the detection of extended targets in presence of additive channel noise and signal-dependent clutter.

14 Claims, 6 Drawing Sheets

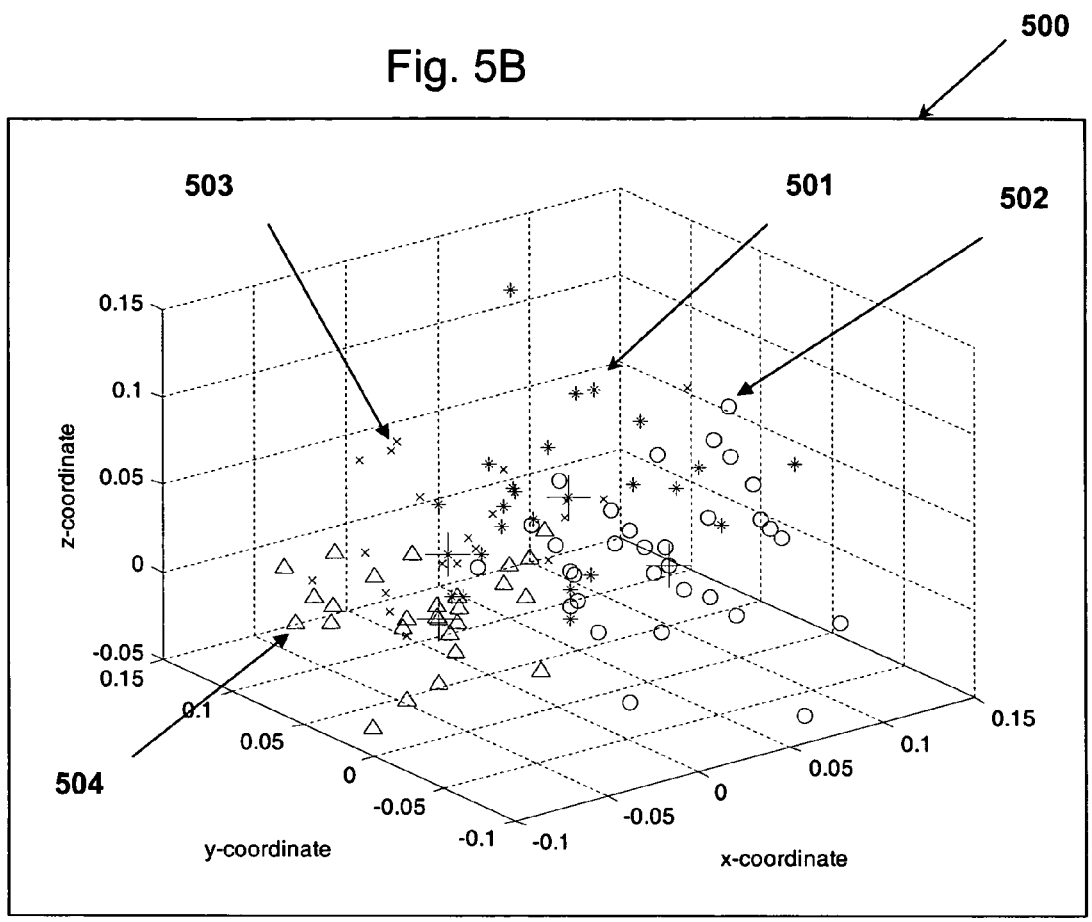

TARGET IDENTIFICATION FROM A POOL OF TARGETS USING A NEW ADAPTIVE TRANSMITTER-RECEIVER DESIGN

STATEMENT REGARDING FEDERALLY SPONSORED RESEARCH OR DEVELOPMENT

The present invention is based upon work supported and/or sponsored by the Defense Advanced Research Project Agency (DARPA) Special Project Office under SBIR Contract No. DAAH01-02-C-R074 and administered by U.S Army Aviation and Missile Command (AMSAM), Redstone Arsenal, Alabama.

FIELD OF THE INVENTION

This invention relates to improved methods and apparatus concerning target detection, such as target detection by radar.

BACKGROUND OF THE INVENTION

The problem of jointly optimizing a transmitter and a receiver so as to maximize the output signal-to-interference plus noise ratio (SINR) for target detection is an important one in radar and many communication scenes where clutter or multipath is a leading source of interference.

In radar scenarios, the total interference signal is comprised of clutter returns, interference signals from jammers and noise. The clutter return is transmit signal dependent and it may or may not dominate the remaining interference signals depending on the target range location. For targets that are nearby clutter dominates the total return, whereas for far field targets the returns from jammers and multipath is the leading source of interference. The interference caused by jammers might be deliberate multipath returns of a white noise source which in essence amount to colored noise with unknown spectrum at the receiver.

In the classical detection problem, the receiver outputs are passed through a bank of filters to obtain a single output and at a specified instant, this output is used to decide the presence or absence of a target. The problem is to design the optimal transmit-receiver pair so as to maximize the output signal-to-interference plus noise ratio (SINR) at the decision instant. In this context, for a given target and clutter/noise scene, the optimum transmit signal shapes as well as the receiver structure for maximizing the output detection performance is of crucial importance as discussed in (1). S. U. Pillai, H. S. Oh, D. C. Youla and J. R. Guerci, "Optimum Transmit-Receiver Design in the Presence of Signal-Dependent Interference and Channel Noise," IEEE Transactions on Information Theory, vol. 46, no. 2, pp. 577–584, March 2000, and (2) J. R. Guerci and P. Grieve, "Optimum Matched Illumination-Reception Radars," U.S. Pat. No. 5,121,125, June 1992, and U.S. Pat. No. 5,175,552, December 1992.

SUMMARY OF THE INVENTION

At least one of the problems addressed in this patent application is the following: from a known set of targets, only one is present in a collection of data at any time. The collection of data typically also contains transmit signal dependent interference and noise. The received data is passed through a set of receiver filters. One of the problems addressed here is to design a single transmitter waveform of given energy and duration, and a set of receivers so as to maximize the correct target classification by maximizing the output SINR in an overall sense.

In the present invention, in one or more embodiments, the optimum transmitter-receiver design procedure for target detection is extended to the target identification problem, whereby a single transmit waveform is generated that optimally separates the target output waveforms in some appropriate sense. A received return is passed through a plurality of matched filters and the largest output at the specified time instant is used to identify a target present in the data. In what follows, the design of the optimum transmitter-receiver pair for the identification problem is carried out.

The proposed target identification method can ensure that specified targets are correctly identified and simultaneously can discriminate all objects present in a scene. The following are at least some of the potential benefits of using an optimal transmitter-receiver waveform design strategy (1) Enhanced target detection, (2) Enhanced target ID, (3) Improved target discrimination, and (4) Dynamic interference suppression in wireless applications A set of possible target waveforms are given. This set can consist of (i) individual targets that are physically present one at a time or (ii) two or more targets that are physically present at the same time forming a new target. Each such configuration gives rise to a target waveform. For example, consider the case where there are only two targets. However they can be present separately or together. The later is treated as a third target and hence the pool of targets in this case is considered as three. At any time only one of them will be present in the scene of interest. A transmit signal is used to interrogate the unknown target and its return from the target gets contaminated by clutter (transmit signal dependent interference) and additive noise. The total received signal is passed through an appropriate set of receiver units. At a pre-determined instant, the receiver corresponding to the largest output is chosen to indicate the actual target present in the scene. The problem is to design the transmit waveform, and receiver filter banks so that for each target in the data, the corresponding receiver output has the maximum among all the receivers at the decision instant.

The strategy of the invention has the following parts:
(i) The received data is first passed through a custom designed whitening filter so that the total interference gets transformed into white noise. The whitened filter also transforms the target waveforms (modified target waveforms).
(ii) Optimum receiver structure to detect signal buried in white noise is the classical matched filter. Matched filters for each of the modified target gives rise to the matched filter bank.
(iii) Combining the above two steps, we obtain the optimum receiver filter bank. This completes the receiver design part.
(iv) When the k-th target is present, the k-th filter output must be larger than all other outputs at the decision instant. The separation between these outputs is used to generate a discriminant. The final step is to maximize this discriminant by varying the transmit waveform.
(v) The transmit waveform has prescribed energy and duration. Optimization of the above distance-discriminant gives rise to an integral eigen-equation whose dominant eigenvector is the desired transmit waveform.

BRIEF DESCRIPTION OF THE DRAWINGS

FIG. 5B shows a diagram of simulation trials of receiver output using a conventional chirp transmit waveform and a companion receiver in accordance with an embodiment of the present invention.

DETAILED DESCRIPTION OF THE DRAWINGS

Figure 1:
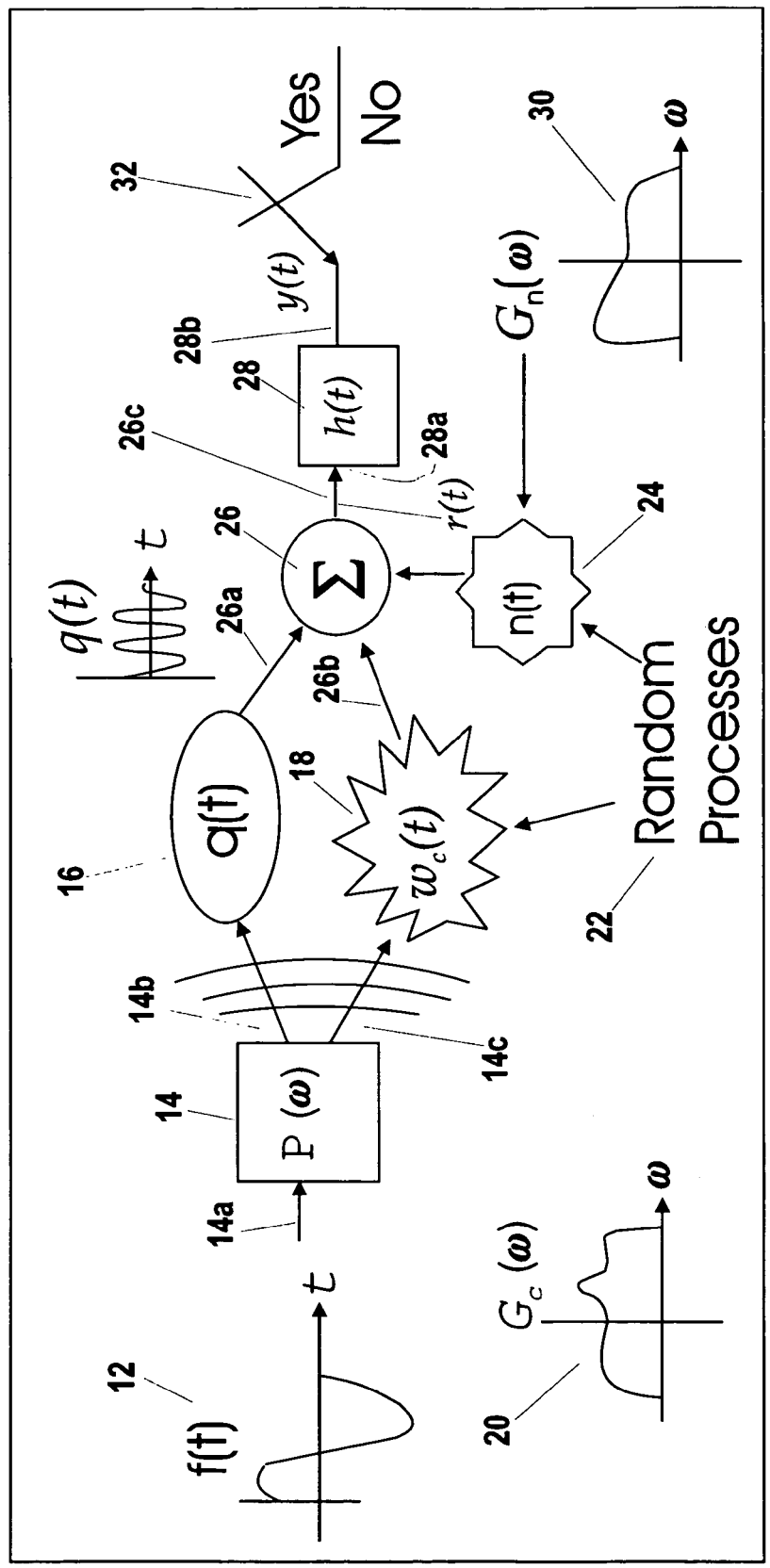
FIG. 1 shows a diagram of an embodiment of the present invention for providing optimum target detection when there is clutter and noise.

FIG. 1 shows a possible target 16 (unknown) from a pool of targets. The pool of targets may include, for example, one or more airborne objects, such as one or more flying airplanes or one or more airborne missiles. The target signal q(t) may be comprised of a plurality of target signals such as $q_1(t), q_2(t), \ldots, q_M(t)$, where M equals the total number of targets. Typically only one of the M targets will be present in any typical situation. However the exact type and nature of the target present is unknown. That needs to be determined from the receiver output. Although only one target is present the user would not know which one is present. The challenge is to determine the exact nature of the target by observing the receiver output. It may be known that the subject target is one of a known possible pool of targets. For example, we may know that the subject target is either a commercial airplane or a fighter jet, and the task may be to determine whether the target is a commercial airplane or a fighter jet.

FIG. 1 also shows the time spectrum 12 of a transmit signal f(t). The transmit signal f(t) is supplied to an input 14a of a transmitter filter 14. The transmitter filter 14 has outputs 14b and 14c. The transmitter output filter P(ω) is of known frequency characteristics. The transmitter output filter 14 filters the transmit signal f(t) to form a filter modified transmit signal at outputs 14b and 14c. The filter modified transmit signal at outputs 14b and 14c may be the same signal. The filter modified transmit signal from output 14b is transmitted through the air and impacts with a target 16. The filter modified transmit signal from output 14c is transmitted through the air and impacts with clutter 18.

The target 16 acts on the filter modified transmit signal, to form a target modified signal which is shown in FIG. 1 as being supplied to input 26a of a summation device 26. The clutter 18 acts on the filter modified transmit signal to form a clutter modified signal which is shown in FIG. 1 as being supplied to input 26b of the summation device 26. In addition, the environmental noise 24 as shown in FIG. 1 as being supplied to the summation device 26. In practice, the target modified signal, the clutter modified signal and environmental noise typically combine together without the need for a summation device 26. However, the summation device 26 is shown for explanation purposes. A combination signal comprised of the target modified signal, the clutter modified signal and environmental noise is formed at an output 26c of the summation device 26. The combination signal is supplied to an input 28a of a bank of matched filters 28. The bank of matched filters 28 may have a transfer function h(t). The transfer function h(t) may be comprised of $h_1(t)$, $h_2(t), \ldots, h_M(t)$, where M is the number of targets.

Figure 2:
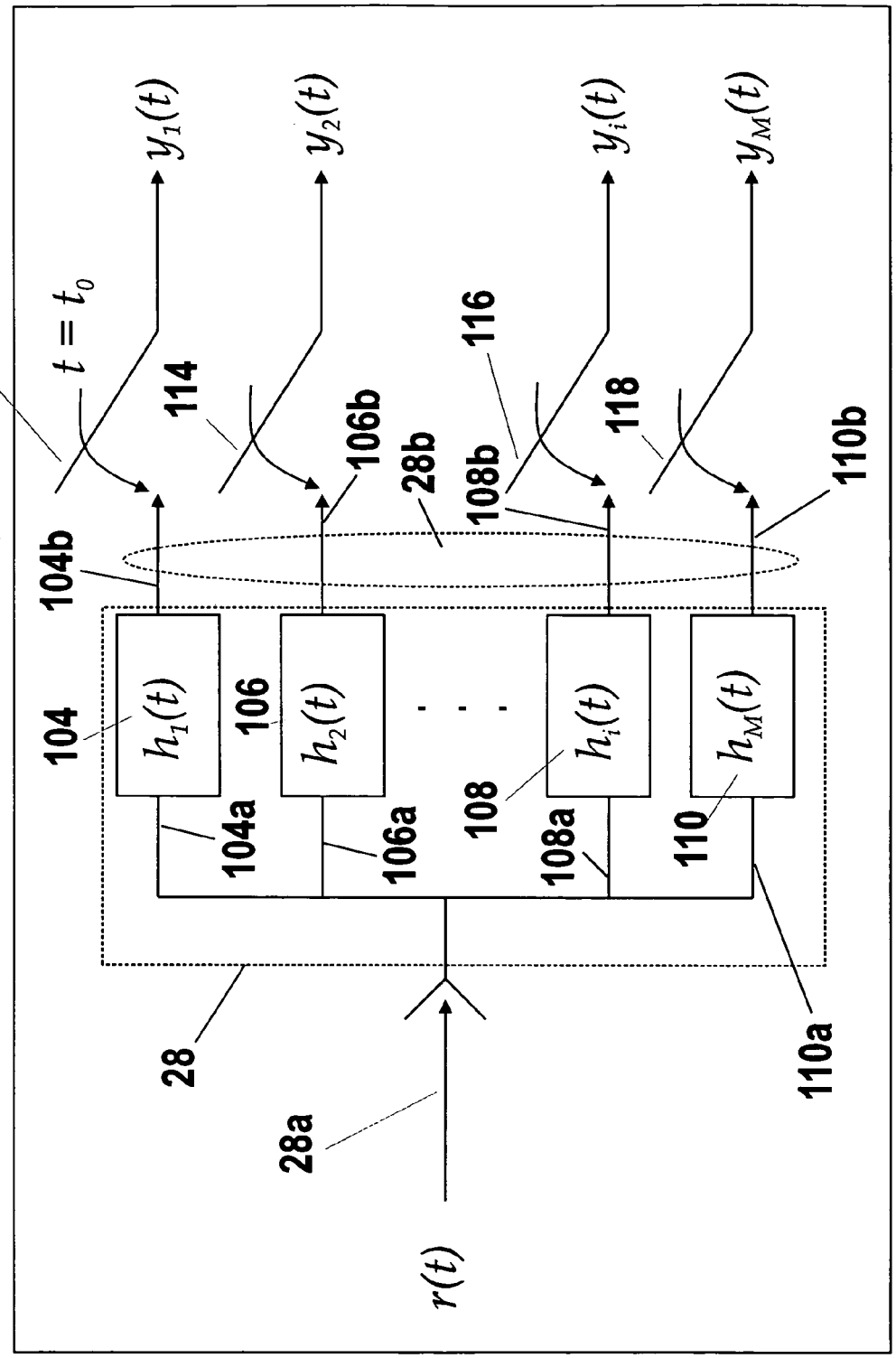
FIG. 2 shows a diagram of an embodiment of the present invention which provides for automatic target identification in a multiple target scene.

The bank of matched filters 28 may include filters 104, 106, 108, and 110, shown in FIG. 2, having transfer functions $h_1(t)$, $h_2(t)$, $h_i(t)$, and $h_M(t)$, respectively. The bank of matched filters 28 would typically include M filters for M targets.

The combination signal at input 28a of the bank filters in FIG. 1, is named r(t) and can also be called the received waveform or received signal. The combination signal or received signal r(t) is supplied to the input 28a of the bank of filters 28. The combination signal or received signal r(t) is then supplied to each of the inputs of each of the plurality of filters 104, 106, 108, 110, and the other filters of filters 1 to M, which are not shown. For example, combination or received signal r(t) is supplied to each of inputs 104a, 106a, 108a, and 110a of filters 104, 106, 108 and 110, respectively, as shown in FIG. 2. Each of the filters, such as filters 104, 106, 108, and 110 acts upon the received signal r(t) with the appropriate filter's transfer function to form a modified received signal at its output. For example, filters 104, 106, 108, and 110 each act upon the received signal r(t) with transfer functions $h_1(t)$, $h_2(t)$, $h_i(t)$, and $h_M(t)$ to form first, second, third, and fourth modified received signals at outputs 104b, 106b, 108b, and 110b, respectively. The bank of filters 28 may have an output 28b which is comprised of outputs 104b, 106b, 108b, and 110b, and a further number of outputs, where the total number of filters and corresponding filter outputs is typically equal to the number of targets. FIG. 2 also shows switches 112, 114, 116, and 118 which ensure that only one output of the outputs 102b, 106b, 108b, and 110b is active or connected at any given time.

The target associated with the filter corresponding to the largest amplitude for its modified received signal output is declared to be present in the data r(t) 26c. For example, if the amplitude of the first modified received signal at output 104b of the filter 104 is greater than the amplitudes of the second, third, and fourth modified received signals at outputs 106b, 108b, and 110b, and of any other modified received signal at any other output, then the first target is declared to be present in the data r(t) 26c.

In accordance with one or more embodiments of the present invention the transmit signal f(t) and the transfer functions $h_i(t)$, $k=1,2,3, \ldots$, M for the filters 104, 106, 108, 110, etc. are jointly selected so that in the presence of a given clutter spectrum $G_c(\omega)$, such as spectrum 20 shown in FIG. 1, and noise spectrum $G_n(\omega)$, such as noise spectrum 30 shown in FIG. 1, the probability of correct target detection is maximized.

In accordance with one or more embodiments of the present invention $H_k$ represents the hypothesis that the k-th target is present in the scene or diagram 10 in FIG. 1. The combination signal or received signal at input 28a in FIG. 1, in that case is given by equation (1) shown below:

$$r(t)=f(t)*p(t)*q_k(t)+f(t)*p(t)*w_c(t)+n(t), H_k, \quad k=1,2, \ldots, M, \qquad (1)$$

wherein the symbol "*" in equation (1) above represents the convolution operation. Convolution of two signals is defined as follows:

$$a(t)*b(t)=\int a(t-\tau)b(\tau)d\tau.$$

and wherein:

$$p(t) \leftrightarrow P(\omega) = \int_{-\infty}^{+\infty} p(t)e^{-j\omega t}dt \qquad (2)$$

In equation (2) above the symbol "↔" represents the Fourier transform pair.

The terms p(t)"↔"P(ω) represent the impulse response of the transmitter filter 14 shown in FIG. 1. The transmitter filter 14 can be used to adjust the bandwidth constraint on the transmit signal f(t) 12. Typically the "Transmitter" is comprised of the transmit signal f(t) and the transmitter filter 14, wherein the transmit filter 14 has a transfer function of P(ω). In FIG. 1, $w_c(t)$, and n(t) are random waveforms representing the transmit signal dependent interferences (clutter) and noise respectively. If $G_c(\omega)$ and $G_n(\omega)$ represent the clutter and noise power spectra, then from equation (1)

$$G_0(\omega) = G_n(\omega) + G_c(\omega)|P(\omega)|^2|F(\omega)|^2 \quad (3)$$

represents the total interference power and $$f(t) \leftrightarrow F(\omega).$$

Figure 3:
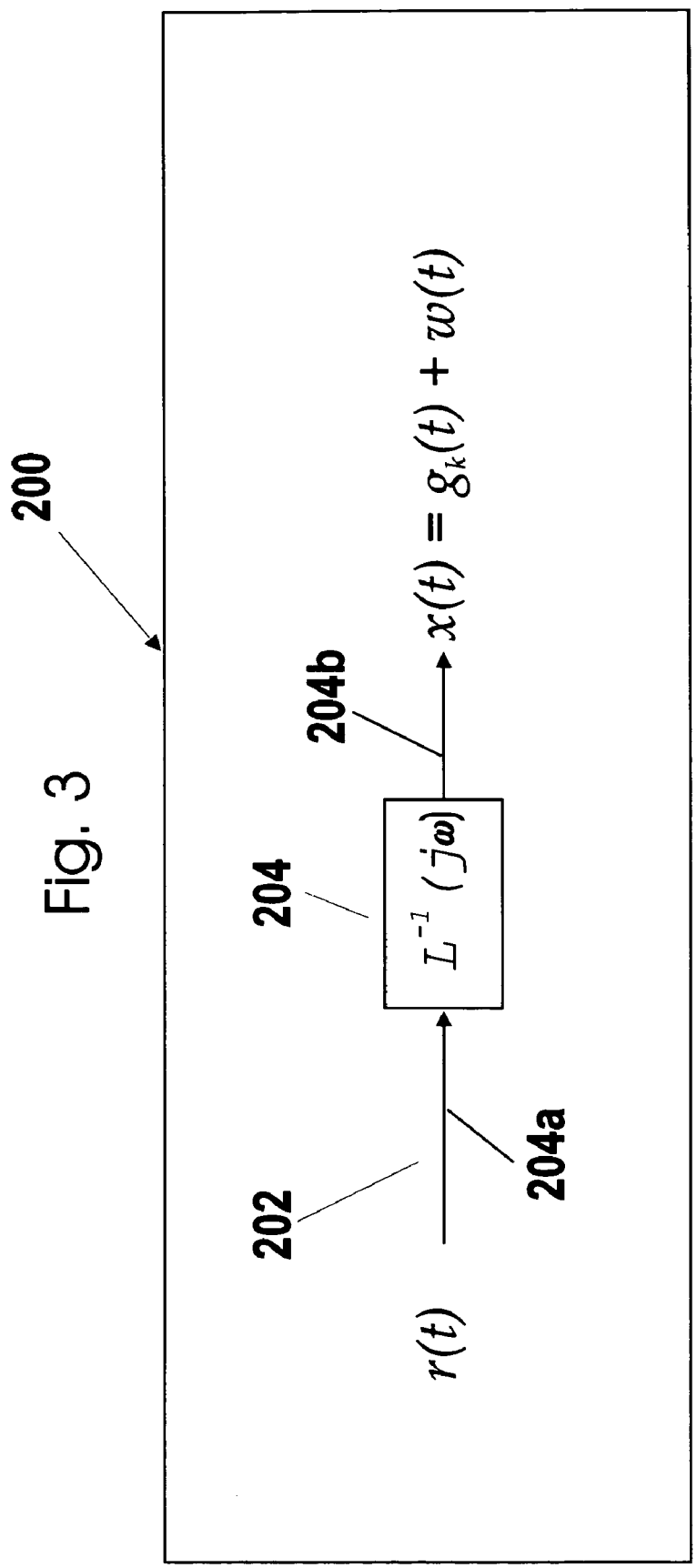
FIG. 3 shows a diagram of a whitening filter.

In accordance with a method of one or more embodiments of the present invention, first an appropriate stable whitening filter 204 shown in FIG. 3 is employed. The whitening filter 204 typically has a transfer function of L(jω) and is used to whiten the total interference. The whitening filter 204 converts the input colored noise spectrum to flat spectrum at the output. For example, an arbitrary frequency sensitive spectral shape at the input is converted to a flat level at the output by the whitening filter 204. The transfer function for the whitening filter 204 is determined by finding the minimum phase factor L(jω) corresponding to $G_0(\omega)$ in equation (3). Thus $$|L(j\omega)|^2 = G_n(\omega) + G_c(\omega)|P(\omega)|^2|F(\omega)|^2, \quad (4)$$

wherein L(jω) represents the Wiener factor and $L^{-1}(j\omega)$ represents the whitening filter 204 of FIG. 3.

In accordance with an embodiment of the present invention, the combination or received signal at output 26c of the summation device 26, is supplied to the whitening filter 204 at input 204a shown in FIG. 3. The whitening filter 204 applies a transfer function $L^{-1}(j\omega)$ to form a signal x(t) at an output 204b of the whitening filter 204. The signal x(t) given by:

$$x(t) = g_k(t) + w(t), k=1, 2, \ldots, M, \quad (5)$$

where $g_k(t)$ represents the signal associated with the k-th target and w(t) the equivalent white noise. Thus $$g_k(t) \leftrightarrow L^{-1}(j\omega)Q_k(\omega)P(\omega)F(\omega), k=1,2,\ldots,M, \quad (6)$$

wherein $$q_k(t) \leftrightarrow Q_k(\omega), k=1, 2, \ldots, M. \quad (6)$$

Figure 4:
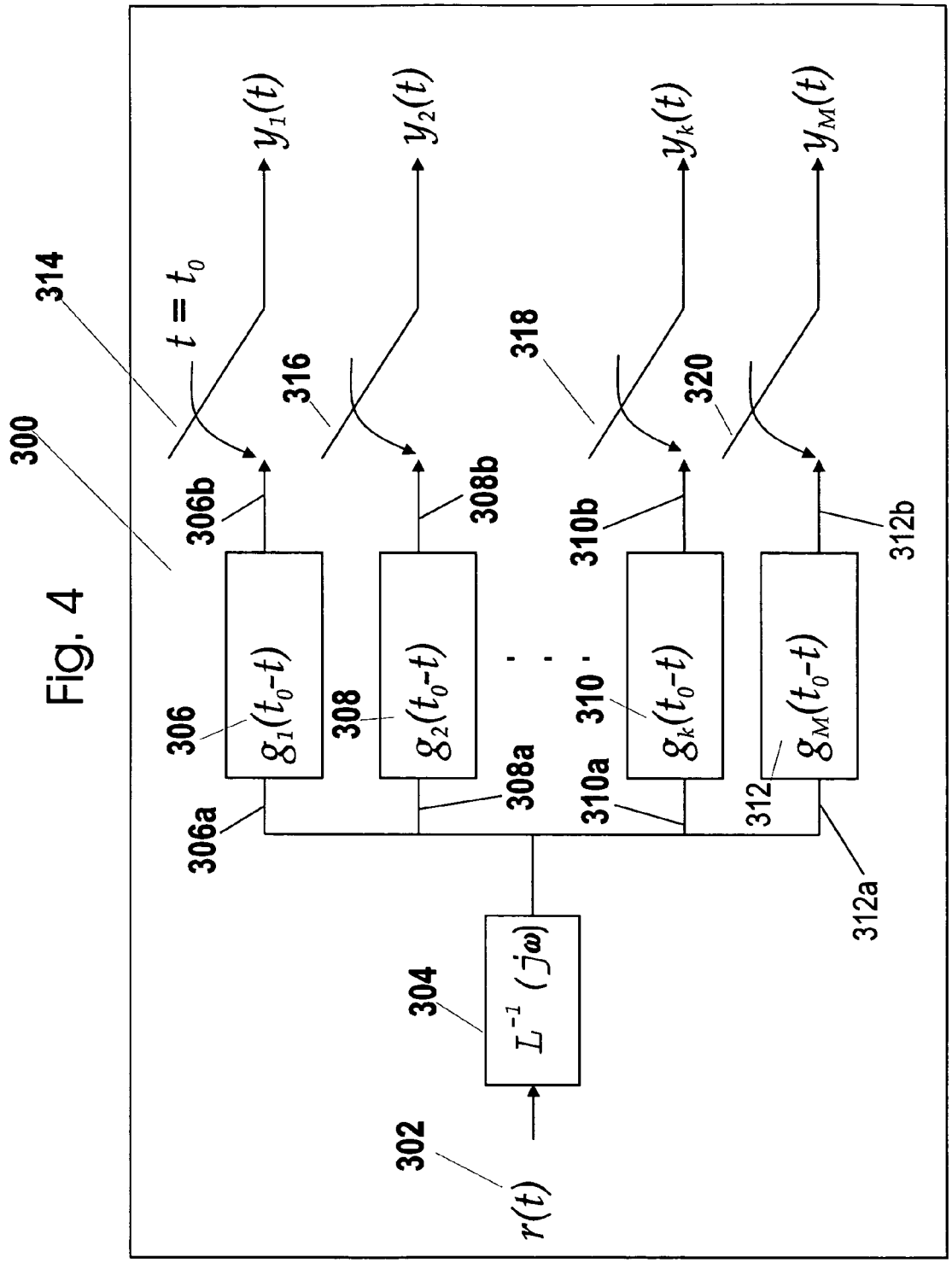
FIG. 4 shows a diagram of an embodiment of the present invention which provides for automatic target identification in a multiple target scene.

In accordance with the present invention, in one or more embodiments, an optimum receiver corresponding to the signal plus white noise case in equation (5) is a matched filter having a transfer function given by the equation (7) below:

$$g_k(t_0-t)u(t), k=1,2,\ldots,M \quad (7)$$

and this gives rise to the receiver structure and characteristics shown in the embodiment of FIG. 4.

FIG. 4 shows a filter or receiver structure 300 which can be used in place of the receiver 28 of FIG. 1. The filter or receiver structure 300 may be comprised of whitening filter 304 which can receive a signal r(t), such as the combination or received signal from output 26c of the summation device 26 in FIG. 1. The filter structure 300 may also include filters 306, 308, 310, and 312, and a further number of filters, so that the total number of filters is typically equal to the number of targets M. Each filter has a transfer function. Filters 306, 308, 310, and 312 have transfer functions $g_1(t_0-t)$, $g_2(t_0-t)$, $g_k(t_0-t)$, and $g_M(t_0-t)$, respectively. The signal r(t) is modified by filter 304 and then is applied to inputs 306a, 308a, 310a, and 312a of filters 306, 308, 310, and 312, respectively, and inputs of a further number of filters not shown, with the total number (not including the whitening filter 304) typically equal to the number of targets M. First, second, third, and fourth further modified signals are output on outputs 306b, 308b, 310b, and 312b of the filters 306, 308, 310, and 312, respectively. FIG. 4 also shows switches 314, 316, 318, and 320. Switches 314, 316, 318, and 320 make sure that only one filter output of the outputs 306b, 308b, 310b, and 312b is active at one time.

From FIGS. 2 and 4, the optimum receivers or filters in the clutter and noise case is given by $$h_k(t) = l_{inv}(t) * g_k(t_0-t)u(t), k=1,2,\ldots,M, \quad (8)$$

where $$l_{inv}(t) \leftrightarrow L^{-1}(j\omega). \quad (9)$$

Under $H_k$, the matched filter outputs at $t=t_0$ are given by (details omitted):

$$y_i = h_i(t) * q_k(t) * f(t) * p(t)|_{t=t_0} \quad (10)$$

$$= g_i(t_0 - t)u(t) * g_k(t)|_{t=t_0}$$

$$= \int_0^{t_0} g_i(t)g_k(t)dt, i = 1,2,\ldots,M.$$

The following procedure or method can be referred to as an optimizing strategy:

When $H_k$ is true, it is desirable that the k-th output $y_k$ must be larger than any other output. As a result, we propose to maximize the following discriminant $$\Lambda_k = (y_k-y_i)|_{H_k} + \ldots + (y_k-y_i)|_{H_k} + \ldots + (y_k-y_M)|_{H_k}, k=1, 2, \ldots, M, \quad (11)$$

for each k.

Combining all these discriminants we get $$\Lambda = \sum_{k=1}^{n} \Lambda_k \quad (12)$$

and the goal is to maximize Λ over the transmit waveform f(t). Substituting (10) into (11) and simplifying we get:

$$\eta = \max \sum_{i=1}^{M} \sum_{k=1}^{M} \int_0^{t_0} |g_i(t) - g_k(t)|^2 dt \quad (13)$$

$$= \max \int_0^T \int_0^T \underbrace{\sum_{i=1}^{M}\sum_{k=1}^{M} \int_0^{t_0} \Delta s_{ik}(t-\tau_1)\Delta s^*(t-\tau_2)dt}_{\Omega_M(\tau_1,\tau_2)} f(\tau_2)f(\tau_1)d\tau_2 d\tau_1$$

$$= \max \int_0^T \left(\int_0^T \Omega_M(\tau_1,\tau_2)f(\tau_2)d\tau_2\right) f(\tau_1)d\tau_1 \leq \lambda_k E,$$

where $\lambda_k$ is the maximum eigenvalue of the integral equation $$\int_0^T \Omega_M(\tau_1,\tau_2)f_k(\tau_2)d\tau_2 = \lambda_k f(\tau_1), \ 0 < \tau_1 < T, k=1,2,\ldots \quad (14)$$

Here the nonnegative-definite kernel is given by $$\Omega_M(\tau_1, \tau_2) = \underbrace{\sum_{i=1}^{M} \sum_{k=1}^{M} \int_0^{t_0} \Delta s_{ik}(t-\tau_1) \Delta s_{ik}^*(t-\tau_2) dt}_{W_{ik}(\tau_1, \tau_2)}, \quad (15)$$

where $$\Delta s_{ik}(t) = s_i(t) - s_k(t). \quad (16)$$

Here $$s_i(t) \leftrightarrow L^{-1}(j\omega) Q_k(\omega) P(\omega), k = 1, 2, \ldots, M. \quad (17)$$

Optimum f(t) corresponds to the eigenvector associated with the largest eigenvalue in (14) and it maximizes the receiver or filter output associated with the actual target present in the data. A well known iterative procedure described in S. U. Pillai, H. S. Oh, D. C. Youla and J. R. Guerci, "Optimum Transmit-Receiver Design in the Presence of Signal-Dependent Interference and Channel Noise," IEEE Transactions on Information Theory, vol. 46, no. 2, pp. 577–584, March 2000, is used to solve for f(t) using equations (4) and equations (14)–(17).

In situations when target spectra are non-overlapping, a linear combination of eigenvectors in equation (14) weighted by the corresponding eigenvalues can be used as the optimum transmit waveform. This gives $$f(t) = \sum_{k=1}^{m} \lambda_k f_k(t), \quad (18)$$

where m can be a fixed number depending upon the number of targets or that depends on the significant number of eigenvalues in equation (14).

At least three methods in accordance with one or more embodiments of the present invention are provided for deciding the number of m dominant eigenvectors used in equation (18) for obtaining the optimum pulse. They are:

Method One: Compute the difference of the first and the twenty fifth eigenvalues, divide that by four and subtract that quantity from the first eigenvalue. Use the eigenvalue index corresponding to this number to be m.

Method Two: Compute the mid point of 0 dB and the maximum eigenvalue in dB. Use the corresponding eigenvalue index to be m.

Method Three: A fixed number of eigenvectors (m=5 or 10 etc).

In cases where the above optimum f(t) is not acceptable in terms of target separability, a weighted optimization procedure can be used in equations (14)–(17) as follows. The following procedure can be referred to as weighted optimization.

In equation (15) define $$W_{ik}(\tau_1, \tau_2) = \int_0^{t_0} \Box s_{ik}(t-\tau_1) \Box s_{ik}^*(t-\tau_2) dt \quad (19)$$

and modify (15) to read $$\Omega_M(\tau_1, \tau_2) = \sum_{i=1}^{M} \alpha_i \sum_{k=1}^{M} W_{ik}(\tau_1, \tau_2) \quad (20)$$

$$= \sum_{i=1}^{M} \alpha_i \Omega_i(\tau_1, \tau_2),$$

where $$\Omega_i(\tau_1, \tau_2) = \sum_{k=1}^{M} W_{ik}(\tau_1, \tau_2) \quad (21)$$

and $\alpha_i$ are a set of constants to be determined. For a given set of $\alpha_i$, follow the procedure regarding optimizing strategy, starting with equation (11) and ending with equation (18) to obtain the desirable transmit waveform f(t). Using f(t) so obtained, compute:

$$r_{ij} = \int_0^T \int_0^T f(\tau_1) W_{ij}(\tau_1, \tau_2) f^*(\tau_2) d\tau_1 d\tau_2 \quad (22)$$

and update $\alpha_i$ to maximize the minimum among $r_{ij}$ in equation (22).

A description of a detailed implementation of the weighted optimization follows:

The method implemented to perform the weighted optimization in equation (20) is an iterative reweighted method, and can be performed for example, by a computer processor which can weigh each of the matrices $\Omega_i$ by a weighting coefficient $\alpha_i$. For example of in the case of three targets:

$$\Omega_M = \alpha_1 \Omega_1 + \alpha_2 \Omega_2 + \alpha_3 \Omega_3$$

where each matrix $\Omega_i$ is as defined in equation (21).

The iterative method proceeds as follows:
  a) Set all weights $\alpha_1$ to be equal and summing to unity.
  b) Set $$\Omega_M = \alpha_1 \Omega_1 + \alpha_2 \Omega_2 + \ldots + \alpha_K \Omega_K.$$

c) Set f to be the maximal eigenvector of $\Omega$.
  d) Compute $$d_i = f^T \Omega_i f$$

for i=1, . . . , K.
  e) Identify which distance is minimum and set $$D = min\{d_i\}.$$

f) Update weighing coefficients $\alpha_i$. Set candidate weighting coefficients $$\alpha'_i = \alpha_i$$

for i≠I.

$$\alpha'_I = (1+\beta)\alpha_I$$

where α>0.
  g) Normalize all weighting coefficients $\alpha'_i$ so that they sum to unity.
  h) Set $$\Omega' = \alpha'_1 \Omega_1 + \alpha'_2 \Omega_2 + \ldots + \alpha'_K \Omega_K.$$

i) Set f' to be the maximal eigenvector of $\Omega'$.

j) Compute $$d'_i = f^T \Omega_i f$$

for i=1, ..., K.

k) if the minimum of $\{d'_i\}$ is greater than D then set $$\alpha'_i = \alpha_i$$

and go to step (a). if the minimum of $\{d'_i\}$ is not greater than D then set $\alpha = \alpha/2$ and go to step f).

This iterative method produces a transmit pulse f(t) with improved target identification performance.

The following example is provided merely to further illustrate one or more embodiments of the present invention. The scope of the invention is not limited to the example.

Figure 5A:
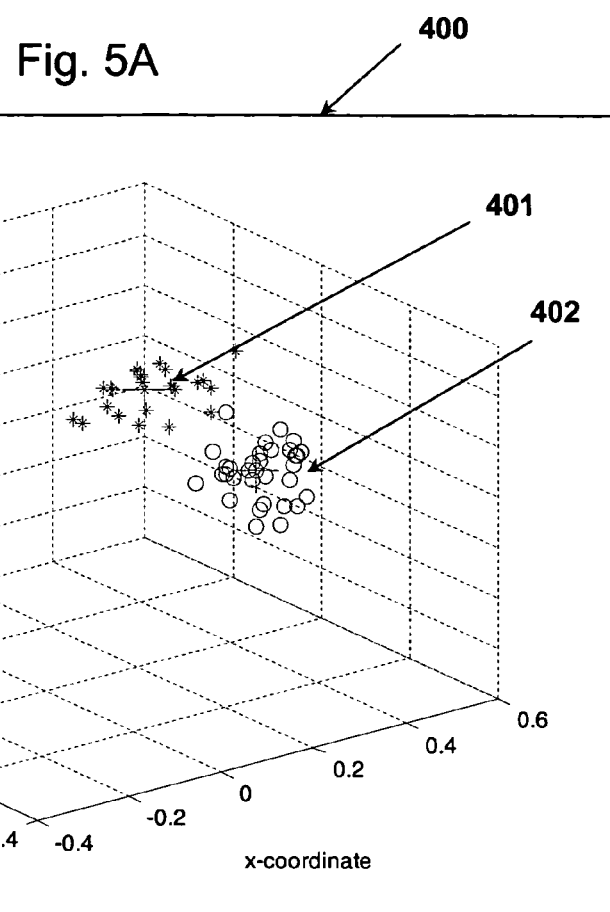
FIG. 5A shows a diagram of simulation trials of receiver output using a transmit waveform and a companion receiver in accordance with an embodiment of the present invention.

A four target scene example of the design of a transmit pulse f(t) for multiple target identification. As shown in FIGS. 5A and 5B, the probability of classification is much higher in the case of the optimal transmit-receiver design strategy in accordance with one or more embodiments of the present invention than that achieved by a conventional chirp. Hence, when signal-dependent clutter is present and it is comparable to channel noise, in any target scene the chirp is almost invariably suboptimal.

FIG. 5A shows a collection of data 400 for one hundred simulation trials of receiver outputs for terminals or outputs 314 (for data set 401), terminal or output 316 (for data set 402), terminal or output 318 (for data set 403), and terminal or output 320 (for data set 404) using the proposed optimum transmit waveform described by equations (14) and 18 and the companion optimum receiver described by equation (8).

FIG. 5B shows a collection of data 500 for one hundred simulation trials of receiver outputs or terminals 314 (for data set 501), terminal or output 316 (for data set 502), terminal or output 318 (for data set 503), and terminal or output 320 (for data set 504) using a conventional chirp transmit waveform and the companion receiver described by equation (8).

FIG. 5A, shows a collection of data 400 for a target pool. The collection of data 400 includes data set 401, which includes a plurality of data items for a first target, wherein each of the data items is identified by a "☆", symbol. Each of the "☆" data items indicates a possible position of the first target as result of a particular experiment in one hundred simulation trials mentioned earlier. The plurality of data items with symbol "☆" form the receiver output corresponding to the first target waveform.

The collection of data 400 also includes data set 402, which includes a plurality of data items for a second target, wherein each of the data items is identified by an "O" symbol. Each of the "O" data items indicates a position of the second target as result of a particular experiment in one hundred simulation trials mentioned earlier. The plurality of data items with symbol "O" form the receiver output corresponding to the second target waveform.

The collection of data 400 also includes data set 403, which includes a plurality of data items for a third target, wherein each of the data items is identified by an "x" symbol. Each of the x data items indicates a position of the third target as result of a particular experiment in one hundred simulation trials mentioned earlier. The plurality of data items with symbol "x" form the receiver output corresponding to the third target waveform.

The collection of data 400 also includes data set 404, which includes a plurality of data items for a fourth target, wherein each of the data items is identified by an "Δ" symbol. Each of the "Δ" data items indicates a position of the fourth target as result of a particular experiment in one hundred simulation trials mentioned earlier. The plurality of data items with symbol "Δ" form the receiver output corresponding to the fourth target waveform. In FIG. 5A, the unknown target 16 is excited by the proposed optimum transmit waveform. The target output 26a is contaminated by colored noise 24 and clutter 18.

In FIG. 5B, the target pool is comprised of four possible waveforms. The unknown target 16 is excited by the conventional chirp transmit waveform. The target output 26a is contaminated by colored noise 24 and clutter 18.

FIG. 5B, shows a collection of data 500 for a target pool. The collection of data 500 includes data set 501, which includes a plurality of data items for a first target, wherein each of the data items is identified by a "☆" symbol. Each of the "☆" data items indicates a possible position of the first target as result of a particular experiment in one hundred simulation trials mentioned earlier. The plurality of data items with symbol "☆" form the receiver output corresponding to the first target waveform.

The collection of data 500 also includes data set 502, which includes a plurality of data items for a second target, wherein each of the data items is identified by an "O" symbol. Each of the "O" data items indicates a position of the second target as result of a particular experiment in the one hundred simulation trials mentioned earlier. The plurality of data items with symbol "O" form the receiver output corresponding to the second target waveform.

The collection of data 500 also includes data set 503, which includes a plurality of data items for a third target, wherein each of the data items is identified by an "x" symbol. Each of the "x" data items indicates a position of the third target as result of a particular experiment in the one hundred simulation trials mentioned earlier. The plurality of data items with symbol "x" form the receiver output corresponding to the third target waveform.

The collection of data 500 also includes data set 504, which includes a plurality of data items for a fourth target, wherein each of the data items is identified by an "Δ" symbol. Each of the "Δ" data items indicates a position of the fourth target as result of a particular experiment in the one hundred simulation trials mentioned earlier. The plurality of data items with symbol "Δ" form form the receiver output corresponding to the fourth target waveform.

Note that FIGS. 5A and 5B are for the same target pool, however different data occurs because a different transmit signal is used.

In FIGS. 5A and 5B the signal-to-noise ratio (SNR) used is 0 dB and clutter-to-noise ratio (CNR) used is 10 dB. The percentage of classification error obtained in the case of optimum transmit pulse is 0% and in the case of the conventional chirp pulse is 39%.

The receiver (or filter) outputs (such as outputs 306b, 308b, 310b, and 312b) may be calibrated using target only inputs i.e. the ideal situation where only one target response, like the response from one aircraft without the presence of any noise or clutter. The calibration of the receiver filters may generate normalized receiver outputs. The normalized receiver output using each target only signal generates a multidimensional output vector that acts as the reference point on the display. The total number of such reference points will be the same as the number of targets in the pool. When clutter plus noise together with an unknown target response is presented to the receiver bank, the receiver outputs generate a new multidimensional vector. This vector is also plotted on the same screen along with all reference points and its closest neighbor among the reference points is declared as the actual target present in the data.

A method in accordance with the present invention may include displaying on a screen in two dimensional or three dimensional format the multidimensional display vectors. The multidimensional display vector may be displayed by being projected in the "target-only case" to obtain the reference points as well as the multidimensional vector generated in the actual data case (target response plus clutter plus noise) into two and three dimensions appropriately. The final two and three dimensional projections are achieved using standard Gram-Schmidt procedure of the multidimensional data set.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising
optimally selecting a transmit signal and a bank of receivers to maximize correct classification of any subject target of a given pool of targets;
wherein a following first equation defines the transmit signal:

$$f(t) = \sum_{k=1}^{m} \lambda_k f_k(t),$$

wherein f(t) is the transmit signal, wherein m is a fixed number depending upon the number of targets;
wherein $\lambda_k$ is the k-th maximum eigenvalue of a following second equation:

$$\int_0^T \Omega_M(\tau_1,\tau_2) f_k(\tau_2) d\tau_2 = \lambda_k f_k(\tau_1), \ 0 < \tau_1 < T, \ k=1,2,$$

wherein $f_k(t)$ is an eigenvector associated with the k-th largest eigenvalue $\lambda_k$ of the second equation;
wherein $$\Omega_M(\tau_1, \tau_2) = \sum_{i=1}^{M} \sum_{k=1}^{M} \frac{\int_0^{t_0} \Delta S_{ik}(t-\tau_1) \Delta S_{ik}^*(t-\tau_2) dt}{W_{ik}(\tau_1, \tau_2)},$$

wherein $\Delta s_{ik}(t) = s_i(t) - s_k(t)$;
wherein t is time M=the number of targets, k is an index that ranges from 1 to M,
wherein $\tau_1$ is a variable from 0 to $t_0$, $\tau_2$ is a variable from 0 to $t_0$, $W_{ik}(\tau_1, \tau_2)$ is a kernal function, $t_0$ is the decision instant; and a Fourier transform $S_i(\omega)$ of $s_i(t)$ satisfies:

$$S_i(\omega) = L^{-1}(j\omega) Q_i(\omega) P(\omega), i=1,2,\ldots,M$$

wherein $L(j\omega)$ is the minimum phase whitening filter who's Fourier transform magnitude $|L(j\omega)|$ satisfies:

$$|L(j\omega)|^2 = G_c(\omega)|P(\omega)|^2|F(\omega)|^2 + G_n(\omega)$$

wherein $G_c(\omega)$: is a clutter spectrum;
wherein $G_n(\omega)$: is a noise spectrum;
wherein $P(\omega)$: is a fourier transform of the transmitter output filter;
wherein $F(\omega)$: is a fourier transform of f(t) in first equation;
wherein $Q(\omega)$: is a fourier transform of the target waveform $q_i(t), i=1,2,\ldots,M$.
and wherein the first and second equations are implemented iteratively.

2. The method of claim 1 further comprising
selecting the bank of receivers so that each receiver of the bank of receivers minimizes any clutter signal or noise signals.

3. The method of claim 1 wherein
the transmit signal is optimally selected by assuming any target in the given pool of targets may be present.

4. The method of claim 1 wherein
the transmit signal and the bank of receivers are selected to minimize clutter and noise signals using the power spectra of the clutter and noise signals.

5. The method of claim 1 further comprising
generating displays using target data with multidimensional visualization for corresponding target location.

6. The method of claim 5 wherein
each receiver of the bank of receivers has an input and an output;
further comprising calibrating each receiver by applying to the input of each receiver a target only input signal corresponding to a target that each receiver is designed to detect;
wherein each target only input signal simulates a situation where only a single target is present;
wherein each receiver generates an output signal at its output in response to each target only input signal so that a plurality of output signals from a corresponding plurality of outputs of a corresponding plurality of receivers are generated for each target only input signal, and
wherein the plurality of output signals form a test multidimensional vector for each target only input signal, so that there are a plurality of test multidimensional vectors corresponding to a plurality of target only input signals.

7. The method of claim 6 further comprising
receiving at each input of each receiver of the bank of receivers, an actual but unknown target signal comprised of a noise signal, a clutter signal and a signal received from an actual target;
producing in response to the actual target signal an actual output signal at each output of each receiver;
wherein the output signals from all of the receivers of the bank of receivers form an actual multidimensional vector.

8. The method of claim 7 further comprising
comparing the actual multidimensional vector to the plurality of test multidimensional vectors to determine which target is present.

9. The method of claim 7 wherein
there are a number of items in the actual multidimensional vector;
and the number of items in the actual multidimensional vector is the same as the number of targets in the target pool.

10. The method of claim 9 further comprising
displaying on a screen in two dimensional format the actual multidimensional vector.

11. The method of claim 9 and further comprising displaying on a screen in three dimensional format the actual multidimensional vector.

12. The method of claim 1 wherein m is determined by computing the difference between the first eigenvalue $\lambda_1$ and the twenty fifth eigenvalue $\lambda_{25}$, dividing that difference by tour to obtain a first result, subtracting that first result from the first eigenvalue $\lambda_1$ to obtain a second result and using en eigenvalue index corresponding to the second result for the number m.

13. The method of claim 1 wherein m is determined by computing the mid point of 0 decibels and the maximum eigen value in decibels for the first equation 14, and using the corresponding eigen value index for the number m.

14. The method of claim 1 wherein m is set to a constant.

\* \* \* \* \*

UNITED STATES PATENT AND TRADEMARK OFFICE
CERTIFICATE OF CORRECTION

| | | |
|---|---|---|
| PATENT NO. | : 7,038,616 B2 | Page 1 of 1 |
| APPLICATION NO. | : 10/743368 | |
| DATED | : May 2, 2006 | |
| INVENTOR(S) | : Unnikrishna Sreedharan Pillai | |

It is certified that error appears in the above-identified patent and that said Letters Patent is hereby corrected as shown below:

Title page, item [76]
The inventor's name should be:   UNNIKRISHNA SREEDHARAN PILLAI Signed and Sealed this Twenty-sixth Day of February, 2008

JON W. DUDAS
*Director of the United States Patent and Trademark Office*